United States Patent

Skodell et al.

[11] Patent Number: 5,683,975
[45] Date of Patent: Nov. 4, 1997

[54] FLOOR WIPING COMPOSITION

[75] Inventors: Birgit Skodell; Rainer Osberghaus, both of Duesseldorf; Karl-Heinz Rogmann, Ratingen, all of Germany

[73] Assignee: Henkel Ecolab GmbH & Co OHG, Duesseldorf, Germany

[21] Appl. No.: 522,249

[22] PCT Filed: Mar. 1, 1994

[86] PCT No.: PCT/EP94/00592

§ 371 Date: Oct. 11, 1995

§ 102(e) Date: Oct. 11, 1995

[87] PCT Pub. No.: WO94/20594

PCT Pub. Date: Sep. 15, 1994

[30] Foreign Application Priority Data

Mar. 10, 1993 [DE] Germany ............... 43 07 473.1

[51] Int. Cl.⁶ ............... C11D 1/12; C11D 1/83; C11D 3/37
[52] U.S. Cl. ............... 510/214; 510/405; 510/426; 510/430; 510/470; 510/475; 510/484; 134/40; 134/42
[58] Field of Search ............... 510/214, 217, 510/470, 475, 405, 430; 134/42, 40

[56] References Cited

U.S. PATENT DOCUMENTS

| | | | |
|---|---|---|---|
| 3,819,530 | 6/1974 | Ratledge et al. | 252/311.5 |
| 3,935,129 | 1/1976 | Jabalee | 252/525 |
| 4,014,808 | 3/1977 | Herpers, Jr. et al. | 252/135 |
| 4,021,376 | 5/1977 | Lamberti et al. | 252/542 |
| 4,141,866 | 2/1979 | Foulks, Jr. | 260/23 X |
| 4,569,782 | 2/1986 | Disch et al. | 252/106 |
| 4,659,494 | 4/1987 | Soldanski et al. | 252/88 |
| 4,725,319 | 2/1988 | Osberghaus | 134/4 |
| 4,725,489 | 2/1988 | Jones et al. | 428/289 |
| 4,842,763 | 6/1989 | Tröger et al. | 252/155 |
| 5,431,840 | 7/1995 | Soldanski et al. | 252/174.17 |

FOREIGN PATENT DOCUMENTS

| | | |
|---|---|---|
| 0215451 | 3/1987 | European Pat. Off. . |
| 2294231 | 7/1976 | France . |
| 1178968 | 8/1963 | Germany . |
| 1284555 | 12/1968 | Germany . |
| 3533531 | 4/1987 | Germany . |
| 1528592 | 10/1978 | United Kingdom . |
| 9211330 | 7/1992 | WIPO . |
| 9215662 | 9/1992 | WIPO . |
| 93235513 | 11/1993 | WIPO . |

Primary Examiner—Christine Skane
Assistant Examiner—Lorna M. Douyon
Attorney, Agent, or Firm—Ernest G. Szoke; Wayne C. Jaeschke; Real J. Grandmaison

[57] ABSTRACT

A composition for cleaning and caring of floors wherein the composition contains synthetic anionic surfactant and a floor-care substance selected from the group consisting of waxes, film-forming polymers, soap and mixtures thereof and wherein at least 20% by weight of the surfactant and soap are present in the form of lithium salts. The composition is diluted with water, wiped on the floor with an absorbent article and allowed to dry.

11 Claims, No Drawings

FLOOR WIPING COMPOSITION

BACKGROUND OF THE INVENTION

1. Field of the Invention

This invention relates to the cleaning of floors using aqueous surfactant solutions.

The processes typically used today for the cleaning and care of floors may largely be divided into three classes:

Processes intended mainly for the care and preservation of floors use compositions which produce more or less hard and resistant films after application to and distribution over the floor surface. To this end, the compositions contain—generally in emulsified form—waxes or film-forming polymers and crosslinking agents, generally heavy metal salts, which together form self-shine or polishable films on the treated surfaces after drying. Long-lasting protection of the surfaces can be obtained in this way, severe mechanical stressing also being effectively tolerated depending on the quality of the film. The disadvantage of these compositions is that removal of the firmly adhering films, as necessitated for example by soiling or damage, is only possible under extreme conditions.

By contrast, processes intended to clean and restore the original surface use compositions with high contents of surfactants, often together with alkaline substances, organic solvents or abrasives. In many cases, soil and old films can be thoroughly removed with such compositions although the surfaces thus cleaned are generally then exposed to resoiling without protection unless they are subsequently subjected to a preserving treatment.

2. Discussion of Related Art

In addition to these thorough cleaning processes, in which the old self-shine films are removed, there are surface cleaning processes which only remove loosely adhering soil without attacking the floor-care film. The compositions used in these maintenance cleaning processes are generally applied in dilute form only and, in their in-use concentration, contain only small quantities of surfactants and at most small quantities of alkali. Normally, they also contain low concentrations of floor-care substances so that they are also known as floor wiping compositions. After drying on the floor, the floor-care substances leave behind a thin additional film which, on the one hand, is able to smooth out any unevenness in the floor surface and which, because it is redissolved during the next treatment, contributes towards easier soil removal. Examples of such compositions can be found in German patent application 35 33 531 and in GB-PS 1,528,592.

In the development of floor wiping compositions, there is a greater need than in the development of other cleaning compositions optimally to solve several problems at the same time. On the one hand, floor wiping compositions should have high cleaning power and should be able to redissolve the floor-care films emanating from previous applications of the compositions without, at the same time, attacking any more or less permanent floor-care films present. In addition, floor wiping compositions should dry so uniformly after application that the surface appears uniform and does not show any residues in the form of streaks or drops. Depending on the choice of the floor-care substances, the compositions can leave behind satin-finish, self-shine or even polishable films. At all events, it is essential that the remaining floor-care film should not promote resoiling. Despite numerous proposals for the formulation of floor wiping compositions, a composition which optimally satisfies all the requirements mentioned above still remains remote. Accordingly, there is still a need to develop an overall more suitable composition.

DESCRIPTION OF THE INVENTION

The present invention provides a solution to this problem in the form of an aqueous composition which contain synthetic anionic surfactant and a floor-care substance from the group consisting of waxes, film-forming polymers, soap and mixtures thereof and which is characterized in that at least 20% by weight of the surfactants present in the composition, including the soaps, are present in the form of lithium salts. The percentage content of surfactants in the form of lithium salts is preferably from 20 to 90% by weight and, more preferably, from 30 to 60% by weight, based on the total surfactants present.

The new compositions are distinguished both by high cleaning performance and by an exceptionally uniform floor-care effect, in addition to which the floor-care films produced with the new compositions are extremely resistant to resoiling, largely irrespective of the floor-care substances used in the compositions, so that it is possible to obtain different surface effects without eliminating the other advantages of the compositions. The use of surfactants in the form of lithium salts has been proposed for the cleaning of textile articles, for example carpets and upholstered furniture (DE 1 178 968 and DE 1 284 555). However, the problems to be solved in this regard are different from those involved in the cleaning of hard floor surfaces. Accordingly, the compositions disclosed in those documents are also differently formulated and, in particular, do not contain any floor care substances of the type required for the care of floors with wiping compositions.

The synthetic anionic surfactants present in the compositions according to the invention are, above all, those of the sulfonate and sulfate type. Surfactants of the sulfonate type include alkyl benzene sulfonates with a $C_{9-5}$ alkyl radical, for example dodecyl benzene sulfonate, and olefin sulfonates, i.e. mixtures of alkene and hydroxyalkane sulfonates, and also the disulfonates obtained, for example, from $C_{12-18}$ monoolefins with a terminal or internal double bond by sulfonation with gaseous sulfur trioxide and subsequent alkaline or acidic hydrolysis of the sulfonation products. Other suitable surfactants of the sulfonate type are the alkane sulfonates obtainable from $C_{12-18}$ alkanes by sulfochlorination or sulfoxidation and subsequent hydrolysis or neutralization or by addition of bisulfites onto olefins and also the esters of α-sulfofatty acids, for example the α-sulfonated methyl or ethyl esters of hydrogenated coconut oil, palm kernel oil or tallow fatty acids.

Suitable surfactants of the sulfate type are the sulfuric acid monoesters of long-chain primary alcohols of natural or synthetic origin, i.e. of fatty alcohols such as, for example, cocofatty alcohols, oleyl alcohol, lauryl alcohol, myristyl alcohol, palmityl alcohol or stearyl alcohol, or $C_{10-20}$ oxoalcohols or secondary alcohols with the same chain length. The sulfuric acid monoesters of aliphatic long-chain primary alcohols ethoxylated with 1 to 6 moles of ethylene oxide (EO) or ethoxylated secondary alcohols are also suitable. Sulfated fatty acid alkanolamides, sulfated fatty acid monoglycerides, long-chain sulfosuccinic acid esters and the salts of long-chain ether carboxylic acids obtainable, for example, by reaction of long-chain alcohols ethoxylated with 1–10 moles EO with chloroacetic acid are also suitable. Unless they are present as lithium salts, the anionic surfactants are preferably used in the form of alkali metal salts, more particularly sodium salts, although ammonium salts or the salts of alkanolamines containing 2 to 6 carbon atoms may also be used. Particularly preferred synthetic anionic surfactants for the purposes of the invention are the alkane sulfonates, the olefin sulfonates, the fatty alcohol sulfates and the fatty alcohol ether sulfates.

The anionic surfactants also include the soaps, i.e. the salts of $C_{10-22}$ and preferably $C_{12-18}$ fatty acids. However, in addition to their surfactant properties which are necessary for cleaning, the soaps also have the property of forming floor-care films on the floor surfaces after drying. Accordingly, soaps may also be present as sole floor-care ingredients in the compositions, particularly in cases where floor-care films with a satin-like finish are required. The soaps are also preferably used as sodium soaps in the composition unless they are present as lithium soaps.

In addition to the synthetic anionic surfactants and optionally soaps, the compositions according to the invention may contain nonionic surfactants. Suitable nonionic surfactants are, above all, the adducts of 3 to 20 moles of ethylene oxide (EO) with primary $C_{10-20}$ alcohols, for example with coco-fatty alcohol or tallow fatty alcohol, with oleyl alcohol, with oxoalcohols or with secondary alcohols of the same chain length. In addition to the water-soluble nonionic surfactants included here, incompletely water-soluble fatty alcohol polyglycol ethers with a low degree of ethoxylation and 3 to 7 ethylene glycol ether groups in the molecule are also of interest, above all when they are used together with water-soluble nonionic or anionic surfactants. Other suitable non-ionic surfactants are the corresponding ethoxylation products of other long-chain compounds, for example fatty acids and fatty acid amides containing 12 to 18 carbon atoms and alkylphenols containing 8 to 16 carbon atoms in the alkyl moiety. In all these products, the ethylene oxide may be partly replaced by propylene oxide (PO). Other nonionic surfactants which may be used in accordance with the invention are the water-soluble adducts—containing 20 to 250 ethylene glycol ether groups and 10 to 100 propylene glycol ether groups—of ethylene oxide with polypropylene glycol, alkylenediamine polypropylene glycol and with alkyl polypropylene glycol containing 1 to 10 carbon atoms in the alkyl chain, in which the polypropylene glycol chain performs a hydrophobic function. Other suitable nonionic surfactants are mono- and diethanolamides of fatty acids and long-chain amine oxides or sulfoxides, for example the compounds N-cocoalkyl-N,N-dimethylamine oxide, N-tallow alkyl-N,N-dihydroxyethyl amine oxide, and also water-soluble alkyl glycosides of which the hydrophobic $C_{8-20}$ alkyl radical is attached by a glycoside bond to a generally oligomeric hydrophilic glycoside unit, for example $C_{12-14}$ fatty alcohol+1.6 glucose. Alkyl polyglucosides are preferred nonionic surfactants in the compositions according to the invention.

In addition to the synthetic anionic and/or nonionic surfactants and soaps mentioned, the compositions according to the invention may optionally contain relatively small quantities of other surfactants if this is appropriate for obtaining special effects and does not affect the other favorable properties of the compositions. Particularly worth mentioning in this regard are the amphoteric surfactants which contain both a cationically charged center (normally a tertiary amino group or a quaternary ammonium group) and an anionically charged center (normally a carboxylate group or a sulfonate group) in their molecule. Examples of such surfactants are N-cocoalkyl-N,N-dimethylaminoacetate and N-dodecyl-N, N-dimethyl-3-aminopropane sulfonate.

The surfactant content of the compositions according to the invention is preferably from 1 to 35% by weight and more preferably from 3 to 10% by weight, based on the total weight of the undiluted aqueous composition. Of the surfactants, preferably 20 to 90% by weight and more preferably 30 to 60% by weight should be present in the form of the lithium salts to ensure that the advantages according to the invention are achieved particularly clearly.

In addition to the soaps already mentioned, waxes and film-forming polymers may be used as the floor-care substances. These substances may be used individually as floor care substances in the compositions according to the invention, although they may also be used in the form of mixtures. Combinations of waxes and film-forming polymers are preferably used by virtue of their particularly balanced floor-care properties.

Suitable waxes are both natural waxes and synthetic waxes which may be of natural origin or even fully synthetic. Examples are polyethylene waxes, oxidized polyethylene waxes, montan ester waxes, paraffin waxes, candellila wax and carnauba wax. Of these waxes, montan ester wax, polyethylene wax and carnauba wax are preferably present in the compositions according to the invention. Wax mixtures of montan ester wax and polyethylene wax and also montan ester wax and carnauba wax are particularly preferred.

The waxes are present in the compositions in emulsified form. Accordingly, unless self-emulsifying waxes are predominantly used, the compositions according to the invention contain typical wax emulsifiers in quantities of up to 50% by weight and preferably in quantities of 10 to 20% by weight, based on the wax content. Examples of such emulsifiers are oleyl cetyl alcohol+20 EO and sorbitan monooleate.

The film-forming polymer compounds are those which are at least partly insoluble in water at a neutral pH value and which have a minimum film-forming temperature of about 0° to about 70° C. The film-forming polymer compounds are preferably polymers produced from ethylenically unsaturated monomers. Examples of such monomers are styrene, acrylic acid or methacrylic acid esters of aliphatic $C_{1-8}$ alcohols, acrylonitrile, vinyl acetate, acrylic acid and methacrylic acid. Poly(meth)acrylates of two or more of these monomers, which may optionally contain other monomers in small quantities, are particularly preferred. Most particularly preferred polymers contain 1 to 30 parts by weight of monomers containing carboxylic acid groups, 30 to 70 parts by weight of monomers which form homopolymers having glass temperatures below 20° C., preferably esters of acrylic acid with $C_{1-8}$ alcohols and/or methacrylic acid with $C_{4-8}$ alcohols and 30 to 70 parts by weight of monomers which form homopolymers having glass temperatures above room temperature, preferably methacrylic acid esters of $C_{1-3}$ alcohols or styrene. Where several different polymer compounds of the type mentioned above are used in the form of a mixture, the film-forming temperature determined for the mixture should be between 0° and 70° C. The film-forming temperatures mentioned apply to the plasticizer-free system, i.e. to the polymers with no other additives.

Examples of such film-forming polymers are the following commercial products available as dispersions: Syntran 1501 (Interpolymer), Primal 644 (Rohm & Haas), Neocryl A 1049 (ICI).

The floor-care substances present in the compositions according to the invention preferably make up 5 to 50% by weight and more preferably 20 to 40% by weight of the total non-volatile constituents (solids) present in the compositions. A combination of wax, polymer and surfactant in a ratio by weight of about 0.5:0.5:2 has proved to be particularly advantageous.

In addition to the compulsory ingredients described above and water, the compositions according to the invention may contain other auxiliaries and additives of the type typically present in such compositions, naturally with the proviso that the positive properties of the compositions are not affected. Examples of such additives are perfume oils, dyes, viscosity regulators, preservatives, amines, solvents, solubilizers, salts and wetting resins. These substances are typically used in quantities of not more than 10% by weight and preferably in quantities of 0.01 to 5% by weight.

In the most simple case, the compositions may be prepared by mixing all the components together in any order. In many cases, however, it is better initially to prepare wax or polymer dispersions in water and then to mix the dispersions with water and the other constituents of the composition.

Basically, the compositions are applied after dilution with water, the degree of dilution being determined by the concentration of the composition. In the dilute solution of the composition adjusted to the in-use concentration, the content of non-volatile constituents should preferably be between about 0.03 and about 1.0% by weight. Depending on the concentration of the undiluted composition, this can be achieved by dilution with water in a ratio of about 1:10 to 1:1,000 and preferably in a ratio of 1:50 to 1:200. The surface is then treated with the solutions adjusted to the in-use concentration by soaking an absorbent article, for example a cloth or a sponge, with the solution and uniformly wiping the surface to be treated with this article. During this treatment, soil and any film residues present from previous treatments are detached from the surface, taken up by the cloth or sponge and transferred to the dilute cleaning solution when the cloth or sponge is rinsed out therewith. The liquid film remaining on the surface dries uniformly and leaves behind a thin floor-care film which is at least partly removed again during the next such treatment.

EXAMPLES

Composition 1 according to the invention and comparison compositions 2 and 3 as listed in Table 1 were prepared by mixing the individual constituents in water. The figures alongside the ingredients represent percentages by weight; the balance to 100% by weight is water. Quantities of 10 ml of the compositions were diluted to 1 liter and used in this form to test the various properties. The test results are also set out in Table 1.

The individual tests were carried out as follows:
1. Testing of cleaning power

The cleaning effect of the wiping compositions was determined using a Gardner washability and scouring tester as described in the quality standards of the Industrieverband Putz- und Pflegemittel e.V. (Seifen-Öle- Fette-Wachse, 108, pages 526 to 528 (1982)). In this method, a white PVC film is provided with a test soil of soot and grease and machine-wiped under standardized conditions with a sponge soaked with the cleaning composition. Cleaning performance is measured by photoelectric determination of reflectance (in %).

2. Testing of cleaning power after pretreatment

This test was carried out in the same way as described in 1. except that, before application of the test soil, the white PVC film was wiped 10 times with the cleaning solution to be tested and allowed to dry. The drying time between the individual wiping cycles was 30 to 45 minutes. The test soil was only applied to the test strips thus prepared on the following day and the cleaning test subsequently carried out.

3. Testing of wetting behavior

The object of this test is to determine to what extent the structure of a floor-care film interferes with wetting during the following cleaning treatment. To this end, a relatively large PVC floor covering was wiped twice daily for 10 days with the dilute cleaning solution to be tested. During the last treatment, wetting behavior was visually observed during wiping and the subsequent drying phase and evaluated on the following scale:

0=product wets the entire surface and does not break up even during the drying phase
1=product wets the entire surface and breaks up during the drying phase
2=product breaks up during wiping and forms islands during the drying phase
3=pronounced island formation observed over the entire surface, leaving a distinctly patchy overall impression after drying.

4. Resoiling test

To evaluate soil uptake and resoiling behavior, a floor covering approximately 60 cm wide and approximately 2 meters in length, which contained relatively large white areas in the form of a pattern, was first wiped 10 times with the dilute cleaning solution to be tested and dried. The covering thus prepared was then laid out over a uniformly trodden area where it was wiped once a day with the dilute test solution. After 10 days, the test was terminated and the surface was visually evaluated before and after the final wiping and evaluated on the following scale:

0=no adhering soil
1=slight soiling
2=average uniform soiling
3=heavy soiling
4=very heavy uneven soiling.

The test results set out in Table 1 clearly show that the composition according to the invention is superior to known compositions in all the properties tested.

TABLE 1

|  | Examples | | |
| --- | --- | --- | --- |
| Ingredients | 1 | 2 | 3 |
| Carnauba wax | 1 | 1 | 1 |
| $C_{12/16}$ alkyl polyglucoside (1.4 glucose) | 1 | 1 | 1 |
| Polyethylene dispersion (Licomer WHS, a product of Hoechst AG) | 1.5 | 1.5 | 1.5 |
| Ethylene glycol monophenyl ether | 1.5 | 1.5 | 1.5 |
| Perfume | 0.5 | 0.5 | 0.5 |
| $C_{8/12}$ Fatty alcohol sulfate Li | 5 | — | — |
| $C_{12/14}$ Fatty alcohol sulfate Na | — | 5 | — |
| $C_{10/14}$ Fatty alcohol + 1.2PO + 6.4EO | — | — | 5 |
| Cleaning power (1) | 43.5 | 41.3 | 40.2 |
| Cleaning power after pretreatment (2) | 56.8 | 51.4 | 48.5 |
| Wetting power (3) | 0 | 1 | 2 |
| Resoiling (4) | 1 | 2 | 3 |

We claim:
1. The process of cleaning and caring of a floor comprising diluting with water to a solids concentration of 0.03 to 1.0 g/l an aqueous composition consisting of 1% to 35% by weight of a synthetic anionic surfactant selected from the group consisting of alkyl sulfates, alkane sulfonates, olefin sulfonates, ether sulfates, and mixtures thereof, 5% to 50% by weight of a floor-care substance selected from waxes, film-forming polymers, soap and mixtures thereof, based on the total solid constituents present in said composition, wherein at least 20% by weight of said surfactant and soap are present in the form of lithium salts, and optionally 1% by weight of an alkyl polyglycoside, and wiping said floor with the diluted composition and an absorbent article.

2. A process as in claim 1 wherein said surfactant is present in the form of lithium salts in an amount of 20 to 90% by weight, based on the weight of said surfactant.

3. A process as in claim 1 wherein said surfactant consists of long-chain monoalkyl sulfate containing 8 to 18 carbon atoms in the alkyl moiety.

4. A process as in claim 1 wherein said floor-care substance consists of said soap.

5. A composition for cleaning and caring of floors, said composition consisting of 1% to 35% by weight of a synthetic anionic surfactant selected from the group consisting of alkyl sulfates, alkane sulfonates, olefin sulfonates, ether sulfates, and mixtures thereof, 5% to 50% by weight of a floor-care substance selected from waxes, film-forming polymers, soap and mixtures thereof based on the total solid constituents present in said composition, wherein at least 20% by weight of said surfactant and soap are present in the form of lithium salts the balance being water and optionally 1% by weight of an alkyl polyglycoside.

6. A composition as in claim 5 wherein said film-forming polymers have a minimum film-forming temperature of 0° C. to 70° C.

7. A composition as in claim 5 wherein said floor-care substance consists of mixture of wax and film-forming polymer.

8. A composition as in claim 5 wherein from 20 to 90% by weight of said surfactant and soap are present in the form of lithium salts.

9. A composition as in claim 5 wherein said surfactant consists of a long-chain monoalkyl sulfate containing 8 to 18 carbon atoms in the alkyl moiety.

10. A composition as in claim 5 wherein said waxes are selected from the group consisting of montan ester wax, polyethylene wax, carnauba wax, and mixtures thereof.

11. A composition as in claim 5 wherein said waxes are present in emulsified form.

\* \* \* \* \*